INVENTORS
RODNEY M. HUCK,
JOHN R. LeBLANC

United States Patent Office 3,792,020
Patented Feb. 12, 1974

3,792,020
HIGH-TEMPERATURE STABLE MODIFIED AROMATIC AMINE-ALDEHYDE MOLDING POWDERS MODIFIED WITH AROMATIC POLYCARBOXYLIC COMPOUNDS
Rodney M. Huck, Longmeadow, and John R. Le Blanc, Wilbraham, Mass., assignors to Monsanto Company, St. Louis, Mo.
Continuation-in-part of abandoned application Ser. No. 119,536, Mar. 1, 1971. This application Oct. 30, 1972, Ser. No. 302,342
The portion of the term of the patent subsequent to July 18, 1989, has been disclaimed
Int. Cl. C08g 9/06, 15/00
U.S. Cl. 260—65
8 Claims

ABSTRACT OF THE DISCLOSURE

Thermosettable molding powders of aromatic amine/formaldehyde resin and aromatic polycarboxylic compound which have been processed with heat in a shear field to advance the composition to the stage where further heating will evolve less than 2 percent of the initial weight as volatiles. The product molding powder displays little or no tendency to blister, swell, or distort during molding and post-curing.

CROSS REFERENCE TO RELATED APPLICATION

This application is a continuation-in-part of application Ser. No. 119,536, filed Mar. 1, 1971, now abandoned.

BACKGROUND OF THE INVENTION

(1) Field of the invention

The present invention relates to thermosettable molding powders. More particularly, the present invention relates to thermosettable molding powders comprising aromatic amine aldehyde resins and polycarboxylic compounds which are characterized by thermal stability, and to a process for preparation of the molding powders.

(2) Description of the prior art

Thermosettable polymeric compositions incorporating an aromatic amine/aldehyde resin and an aromatic polycarboxylic compound have recently been developed; see for example, Huck and Le Blanc U.S. Pat. 3,678,008, which issued on July 18, 1972. These compositions have, when thermoset, characteristically, excellent thermal stability characteristics, as exemplified, for example, by unusually high maximum continuous service temperatures for the thermoset compositions.

However, these new thermosettable compositions have been found to require unusually prolonged molding and post-curing times at elevated temperatures to achieve a thermoset state. Also, these new compositions sometimes display a certain amount of blistering, swelling, and distortion when formed into molded bodies, especially bodies which are, following molding, subjected to a post-curing operation. Such blistering, swelling, and distortion is caused by the evolution of volatiles from the thermosetting compositions. These volatiles comprise mainly water but also include minor amounts of unreacted starting materials (e.g. aniline). The high temperature exposure associated with molding and post-curing causes these volatiles to evolve with the visible effects noted.

Because of these generally undesirable long processing times and undesirable visible effects associated with volatiles evolution, a considerable expenditure of time and effort has been expended in seeking to overcome or minimize these difficulties in molding powders of these new thermosettable polymeric compositions.

As those skilled in the art of conventional, thermosetting molding powders will readily appreciate, it has heretofore been the practice to mold in the range of from about 300 to 360° F. Such conventional resins characteristically cure rapidly (times of from about 2 to 5 minutes for a ¼ inch section being typical) so that a molded body has sufficient hardness and strength not to experience appreciable blistering, swelling and/or distortion during volatiles evolution therefrom. Although, ordinary thermosetting resins such as novolacs can be post-cured after molding to maximize heat resistance, the improvement in heat resistance achieved by post-curing such resins is characteristically only incremental so conventionally ordinary novolac based molding powders are not post-cured after a molding operation. Typically, ordinary novolac resin molding powders display maximum continuous service temperatures on the order of about 280 to 350° F. when molded (with or without post-curing).

In the case of the new thermosetting, molding powders of aromatic amine/aldehyde resin and aromatic polycarboxylic compound, however, it is necessary to mold in the range from about 440 to 650° F. which is far higher than is used with conventional thermosetting molding powders. Furthermore, even at these elevated temperatures, these new molding powders cure slowly so that apparently times of from about ½ to 2 hours at 500 to 600° F. for a ¼ inch section are required typically for curing (thermosetting). Because of the higher temperatures and longer curing times involved, the vapor pressure of the volatiles evolved during molding and post-curing of a molded body made with these new molding powders is such as to cause at times appreciable undesired changes in the body (e.g. blistering, swelling, distortion, etc.). The problem here is that the molded body has insufficient strength and hardness at the time these volatiles are evolved to prevent such changes. Usually, the greatest such changes in such a molded body occur in the post-curing operation and not in the molding operation. Hence, these new molding powders present a type of volatiles evolution problem not heretofore encountered in conventional thermosetting molding powders.

Surprisingly and unexpectedly, there has now been discovered a technique for processing in a preliminary way such new thermosettable aromatic amine/aldehyde compositions so as to produce molding powders in which, when such so-processed molding powders are subsequently molded and/or post-cured, cure times and volatiles evolution (compared to unprocessed systems) are minimized without adversely affecting either molding powder moldability or the excellent high-heat performance characteristics associated with this class of thermosettable polymeric compositions when thermoset.

SUMMARY OF THE INVENTION

This invention is directed to improved thermosettable molding powders which are adapted:

(A) To be molded into articles of manufacture using temperatures ranging from about 440 to 650° F. and pressures ranging from about 2,000 and 20,000 p.s.i. or even higher, (B) To have a minimized evolution of volatiles during molding and thermosetting, and (C) When so molded and thermoset to have a maximum continuous service temperature in the range of at least about 525 to 600° F.

These molding powers are derived from dry, powdered starting compositions of an aromatic amine/aldehyde resin and an aromatic polycarboxylic compound by subjecting such a starting composition simultaneously to both:

(1) A shear field of from about 50 to 800 sec.$^{-1}$, and (2) A temperature of from about 200 to 500° F. for a time sufficient to cause a total volatiles loss in said starting composition of from about ½ to 9 weight percent (based on total composition starting weight) and preferably to a temperature of from about 300 to 500° F. for a time sufficient to advance the blend of starting components to the stage where further heating of the blend at 600° F. generates less than 2 percent of the initial weight of the blend as volatiles.

A starting composition can include from about 10 to 80 weight percent of filler.

Molded articles of manufacture are produced from such product thermosettable molding powders by subjecting such a product molding powder simultaneously to temperatures ranging from about 450 to 650° F. and pressures ranging from about 2,000 to 20,000 p.s.i. for a time of from about 10 to 200 minutes.

The resulting so molded body can be thereafter substantially completely thermoset by subjecting it to temperatures ranging from about 300 to 700° F. in a programmed sequence of increasing temperature increments of from about 25–50° F. each applied for 2 to 8 hours at each increment, said sequence being accomplished within a total time interval ranging from about 24 to 48 hours.

This invention is further directed to the processes for producing such products.

DESCRIPTION OF THE DRAWINGS

The present invention is better understood by reference to the attached drawings wherein:

Referring to FIG. 1, an aromatic amine/formaldehyde resin (see box designated A–F Resin), an aromatic polycarboxylic compound (see box designated A–P–C Compound), and filler(s), which are optional but preferred ingredients in a starting composition (see box designated Filler(s) (Optional)) are blended together using heat and a shear field (see box labeled Disperse Compound in Resin Using Heat and Shear Field). As a preliminary, the aromatic amine/formaldehyde resin, and/or aromatic polycarboxylic compound, are ground, respectively, to some prechosen particle size (see boxes designated Grind (Optional)), and also the aromatic amine/formaldehyde resin and the aromatic polycarboxylic compound are preferably preblended together with filler (if such is used) in a dry form (see box labeled Dry Blend (Preferred)) before the starting blend is subjected to heat and shear. Because of the mixing action of the shear field, the components can be mixed during application of heat and shear. It is believed that during application of heat and shear, the aromatic polycarboxylic compound becomes dispersed in the resin. Under relatively mild conditions of heat and shear, relatively little reaction takes place between carboxylic compound and resin while a maximum of mixing (dispersing of carboxylic compound in resin) takes place. Typical mild conditions of heat and shear involve temperatures ranging from about 200 to 300° F. and shear in the range from about 50 to 100 sec.$^{-1}$.

Figure 1:
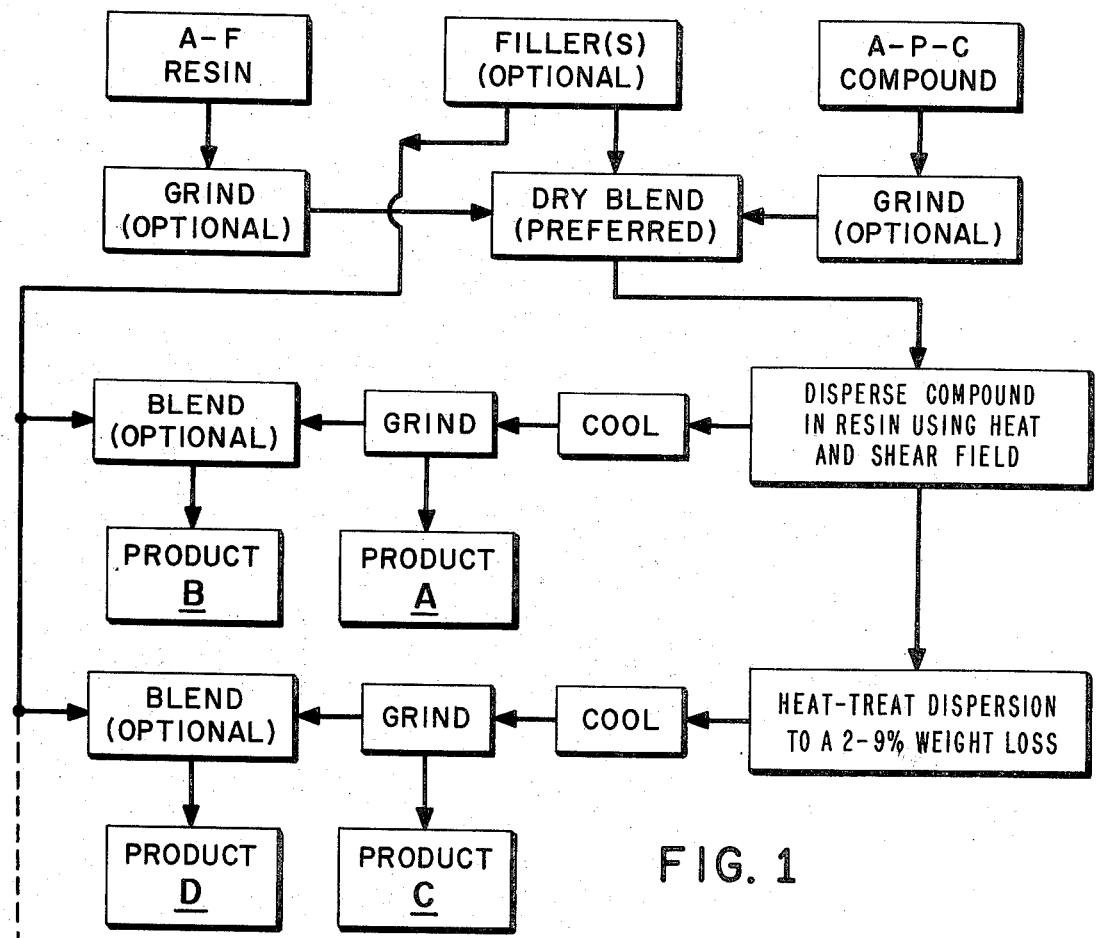
FIG. 1 is a flow sheet illustrating a preferred manufacturing procedure for practicing the present invention.

In the manufacturing sequence of FIG. 1, it is preferred to subject a starting mixture to such relatively mild heat/shear conditions before subjecting such to more vigorous conditions (see box labeled Heat Treat Dispersion to a 2–9% Weight Loss). Such relatively mild heat/shear conditions are conveniently provided by mill rolling, as, for example, by using a pair of differential rolls each about 5 inches in diameter where the front roll is heated to about 240° F. and the back roll is maintained at ambient temperatures (e.g. about 77° F.) with the rolls revolving about 50–80 r.p.m. using a shear rate of about 75 to 100 sec.$^{-1}$.

The more vigorous conditions typically involve temperatures ranging from about 300 to 600° F. and shear in the range from about 80 to 800 sec.$^{-1}$. Such conditions are conveniently provided by a Banbury mixer. Preferably, such rates range from about 100–400 sec.$^{-1}$.

Observe that when using mill rolls, the heat/shear combination is, in effect, applied to a composition intermittently only when such composition is in the vicinity of, and passing through, the nip region between rolls. Residence time in this nip region is characteristically usually less than about 1 second. In contrast, observe that when using a Banbury, the heat/shear combination is, in effect, applied to a composition continuously, so that actual elapsed time spent by a composition under heat/shear tends to build up far more rapidly in a Banbury mixer than in a mill roll mixer.

To make a molding powder of this invention by a FIG. 1 sequence using only mild conditions of heat/shear, one subjects a starting composition to these conditions for a time sufficient to advance the starting composition to the desired degree of advancement, measured by the volatiles subsequently generated at 600° F. Thereafter, even though the compositions of this invention are relatively slow to thermoset, it is convenient and preferred to cool the compositions to a suitable temperature conveniently about ambient temperature so as to stop any appreciable thermosetting (see box labeled Cool). Next, this product is usually subjected to a grinding operation (see box labeled Grind) to reduce average particle sizes therein for convenience in forthcoming molding operations. Finally, this product is usually admixed (see boxes labeled Blend (Optional)), if desired, with various additives, especially filler(s) to produce a molding powder ready for some particular end use application (see boxes labeled Product A and Product B).

To make a molding powder of this invention by a FIG. 1 sequence using vigorous heat/shear conditions, one can employ first mild conditions of heat/shear applied to a starting composition only for a time sufficient to disperse substantially completely aromatic polycarboxylic compound in aromatic amine/formaldehyde resin. During this time, little or even substantially no volatiles evolution may occur from the starting composition, depending upon particular conditions employed for this mixing operation. Thereafter, one applies to the so-mixed composition the more vigorous conditions of heat/shear. For example, and preferably, this preliminary mixing operation may be accomplished using mill rolls, and thereafter the mixed composition is transferred to a Banbury mixer for more vigorous conditions of heat/shear where volatiles are evolved from the composition to the desired extent. The resulting mass is usually then cooled to a suitable temperature conveniently about 75° F. (so as to stop any thermosetting) and then the cooled product is usually subjected to a grinding operation to reduce average particle sizes therein for convenient use in forthcoming molding operations. Finally, the ground product is usually admixed with additives, particularly filler(s) to make a molding powder ready for end use. (See the boxes labeled, respectively, Cool, Grind, and Blend.) Preferred products of this invention are produced using vigorous heat/shear conditions (see boxes labeled Product C and Product D).

Figure 2:
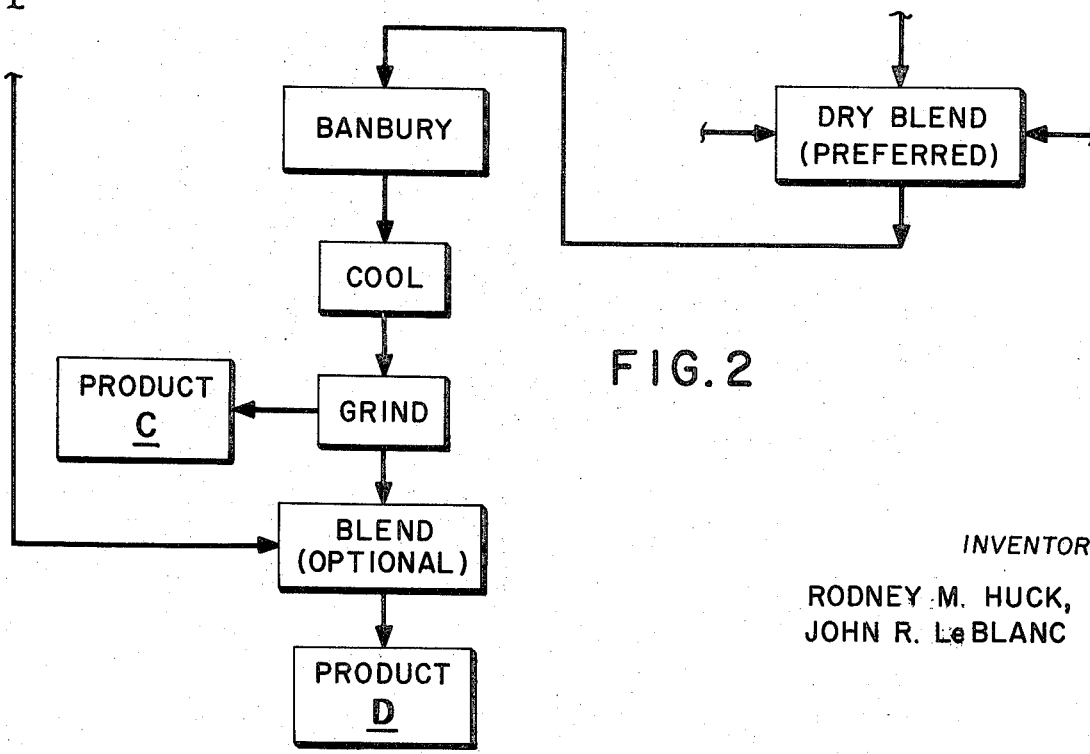
FIG. 2 is a flow sheet illustrating a preferred procedure for making certain preferred products of the present invention.

In FIG. 2 is shown a preferred technique for making products of the type designated as Product C and Product D in FIG. 1. Here, starting components are preferably first dry blended and then are fed directly to a Banbury mixer (see Examples 8 and 9 below).

Afterwards, the so-processed product is cooled ground, and blended as above indicated to produce Product C and Product D.

Products A, B, C, D are used by (1) molding (in which partial curing is effected), and, optionally, (2) post-curing (in which substantially complete thermosetting is effected).

PREFERRED EMBODIMENTS

In general, a preferred class of aromatic amine-aldehyde resins has a primary amine ($H_2N-$) content smaller than about 95 mol percent and a secondary and tertiary combined amine ($HN<$) content greater than about 30 mol percent where 100 mol percent is the total amine content. In general, however, an aromatic amine-aldehyde resin suitable for use in this invention is characterized by having:

(1) A number average molecular weight of from about 200 to 1,000, (2) At least two aryl moieties per molecule, the aryl nucleus of each aryl moiety containing from 6 through 10 carbon atoms each, (3) Less than 0.9 divalent bridging moieties per said aryl moiety of the formula:

(1) 

wherein $R_1$ and $R_2$ are each individually selected from the group consisting of hydrogen, alkyl radicals of less than 5 carbon atoms. Each said bridging moiety having each unsatisfied valence of its carbon atom each bonded to a different one of said aryl moieties, (4) Either at least one —NH group or at least one —$NH_2$, or both, per each resin molecule, one bond of which is directly attached to one of said aryl nuclei and the other bond of which is attached to another of said aryl nuclei or to a radical $R_1$ as defined above, (5) A number average of primary amine groups per said aryl moiety of less than about 0.99, and (6) A percent nitrogen acetyl of from about 10 to 30.

In general, aromatic amine-aldehyde resins are well known to the art. See, for example, Carleton Ellis in "The Chemistry of Synthetic Resins (1935)," Reinhold Publishing Company, pp. 686–702.

In general, any aromatic polycarboxylic compound known to the prior art may be employed in the practice of this invention. One preferred class of such compounds for use in the present invention is characterized by the general formula:

(2) 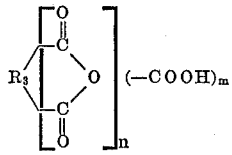

in which R is an aromatic radical of three, four, five, or six valences and containing from 6 to 24 carbon atoms; $n$ is an integer of from 0 through 3; $m$ is an integer of from 0 through 6; and the sum of $2n+m$ is always equal to the valences of $R_3$.

Preferably $R_1$ and $R_2$ are both hydrogen, $R_3$ contains a single six-membered aromatic ring (i.e. phenyl), and $R_4$ is a lower alkyl radical. The term "lower" as used herein refers to a radical containing less than seven carbon atoms.

In any given starting composition, the relative proportions of said aromatic amine/aldehyde resin and said aromatic polycarboxylic compound are such that said composition is thermosettable by heat; for example, at a temperature of at least about 400° F. without pressure.

In general, thermosetting of a starting or product thermosettable resin composition of this invention results from the reaction of an aromatic polycarboxylic compound with the reactable aromatic amine group in an aromatic amine/aldehyde starting material. In a starting composition, sometimes as little as about 5 or 10 weight percent (or even less) of the stoichiometric amount (that is, the amount of carboxyl compound) needed to completely react on a 1:1 mol basis each reactable aromatic amine group plus each reactable aromatic hydroxyl group with each carboxyl group is sufficient to effect thermosetting. On the other hand, sometimes as much as a 100 percent excess of the stoichiometric amount as just described of carboxyl compound is desirable in a composition of the invention to produce thermosetting of a composition of this invention. Preferably from about 80 to 110 weight percent of such stoichiometric amount is employed.

For purposes of this invention, the term "thermoset" or "thermosetting" in reference to starting or product compositions of this invention indicates that a given thermosettable composition, after exposure to elevated temperatures for times sufficient to substantially completely react together substantially all of one of the two components (depending upon which one is present in excess of stoichiometric amount) with the other component comprising a composition of this invention so as to produce a product which is not only substantially insoluble, but also is substantially infusible. For purposes of this invention, the term "substantially insoluble" in relation to "thermoset" or "thermosetting" has reference to insolubility (or extractability) in common organic solvents, such as methyl ethyl ketone, so that not more than about 10 weight percent of a given so thermoset product dissolves in such a solvent. Similarly, the term "substantially infusible" has reference to the fact that a given or thermoset product does not appreciably melt before decomposing when heated to elevated temperatures.

Because of the tendency for undesirable side reactions to occur (such as hydrolysis of the Formula 2 compounds), and because of the possibility that the thermosettable compositions of this invention will not uniformly crosslink in the presence of appreciable amounts of moisture, the starting compositions used in this invention are prepared using aromatic amine/aldehyde resins and aromatic polycarboxylic compounds, respectively, in substantially anhydrous form. The term "substantially anhydrous" has reference to the fact that a given material contains initially less than about 5 weight percent free water (based on total weight) and preferably less than about 1 weight percent thereof and most preferably less than about ½ weight percent thereof.

For purposes of this invention, total nitrogen acetyl percent of an aromatic amine-aldehyde resin is conveniently determined by the method of Sidney Siggia given in "Quantitative Organic Analysis," John Wiley & Sons, 3rd ed., 1963 (by standard acetic acid anhydride and pyridine).

Typical aromatic amine beginning materials suitable for use in making the aromatic amine-aldehyde resins used in this invention are aromatic amines which have at least one primary amine group, or at least one secondary amine group substituted on an aromatic nucleus per molecule.

Preferred aromatic amines are aniline, the alkyl-substituted anilines wherein the alkyl groups thereof have from 1 to 4 carbon atoms, and the alkyl-substituted diaminobenzenes wherein the alkyl groups thereof have from 1 to 4 carbon atoms. Similarly, formaldehyde is preferred as the aldehyde. In general, the teachings of Huck and Le Blanc U.S. Pat. 3,678,008, issued July 18, 1972 are followed in preparing and selecting aromatic polycarboxylic compounds for use in this invention.

In general, a starting composition for use in this invention is in the form of a free-flowing powder. It is preferred to use an aromatic amine/aldehyde resin and an aromatic polycarboxylic compound in the form of respective solids which have particle sizes generally under about 100 mesh (U.S. Standard sieves). More preferably, particle sizes under about 170 mesh are used. The admixing of one component with the other can be made in a blender, such as a so-called Waring Blender, a ball mill, mill roll, or the like, although any convenient mechanical mixing means may be employed.

Those skilled in the art will readily appreciate that various conventional additives can be composited with the starting compositions used in this invention to promote effectiveness for particular end uses. For example, one can add fillers, dyes, colorants, release agents, fungicides, coupling agents, and the like.

In the case of particulate solid diluent materials conventionally used in making molding compositions, one can admix with a starting composition of this invention from about 10 to 80 weight percent (based on total starting composition weight) of particulate inert diluent. In addition, a molding composition typically contains in addition from about 1 to 2 weight percent of a lubricant and from about 1 to 2 weight percent of a colorant, though relatively higher or lower percentages of these last indicated components may be present in a starting composition, as those skilled in the art will appreciate.

In practicing the present invention, one can employ any convenient apparatus which will apply to a starting composition the heat and shear conditions above indicated. For reasons of convenience, mill rolls and Banbury mixers are commonly employed. However, when larger amounts of volatiles are being eliminated, devices capable of greater shear rates (with heat) such as Banbury mixers are preferred.

EMBODIMENTS

The following examples are presented in illustration of this invention and are not intended as limitations thereof. Where "parts" are mentioned, parts by weight are intended unless otherwise indicated.

The following examples illustrate preparation of aromatic amine/aldehyde resins.

EXAMPLE A

Preparation of aromatic amine-aldehyde resin 1200 grams (12.9 moles) of aniline are heated to 70° C. in a 3-liter, 3-neck Pyrex reaction flask that was equipped with stirrer, thermometer, reflux condenser and dropping funnel. At 70° C., 15.6 grams (0.38 mole) of 90 percent strength formic acid are added and allowed to mix. Next, over about a 2 hour period, 775 grams (12.9 moles) of 50 weight percent aqueous formaldehyde solution are added to the reaction mixture while stirring vigorously. The temperature of the reaction mixture is gradually increased so that at the end of the formaldehyde addition the temperature is about 100° C. The reaction mixture is refluxed for about 45 minutes at about 100° C. The reaction flask is then changed over to vacuum distillation conditions and vacuum slowly applied up to about 7" Hg (temperature leveled at about 90° C.). As the temperature reached about 95° C. (with about 7" Hg vacuum), the vacuum is increased slowly to about 10" Hg. As the temperature reaches about 100° C., the vacuum is increased slowly to about 20" Hg. When the temperature reaches about 110° C., the vacuum is increased slowly to 28" Hg. The temperature is then allowed to rise to 160° C. with 28" Hg of vacuum while continuing to distill. At 160° C., the distillation is stopped and the product poured into a pan to cool. The resulting aromatic amine aldehyde resin is a clear, low melting solid at room temperature.

EXAMPLES B–I

Following the same general procedure described in Example A, a series of aromatic amine-aldehyde resins were prepared from various aromatic amines and aldehydes. Table I below describes each resin.

TABLE I

| Example | B | C | D | E | F | G | H | I |
|---|---|---|---|---|---|---|---|---|
| Aromatic amine | Aniline | Aniline | o-Toluidine | Aniline | o-Chloroaniline | Aniline | Aniline | Aniline |
| Aldehyde | Formaldehyde | Formaldehyde | Formaldehyde | Acetaldehyde | Formaldehyde | Formaldehyde | Formaldehyde | Formaldehyde |
| Molar ratio of aldehyde | 0.75/1 | 0.90/1 | 1/1 | 1/1 | 0.90/1 | 1/1 | 0.90/1 | 0.90/1 |
| Catalyst | Propionic acid | Oxalic acid | Formic acid | Formic acid | Oxalic acid | Hydrochloric acid | Acetic acid | Hydrochloric acid |
| Molar ration of catalyst to aromatic amine | 0.013/1 | 0.10/1 | 0.05/1 | 0.013/1 | 0.02/1 | 0.10/1 | 0.50/1 | 0.25/1 |

EXAMPLE J

Preparation of aromatic amine-aldehyde resin 500 grams (5.38 moles) of aniline, 300 grams of water and 538 grams (5.38 moles) of 37 percent hydrochloric acid are heated to 60° C. in a 3-liter, 3-neck Pyrex reaction flask that is equipped with stirrer, thermometer, reflux condenser and dropping funnel. Next, over a 2 to 3 hour period, 200 grams (3.33 moles) of 50 weight percent aqueous formaldehyde solution is added to the reaction mixture while stirring vigorously. The temperature of the reaction mixture is gradually increased so that at the end of the formaldehyde addition, the temperature is about 95° C. The reaction mixture is then refluxed for about 60 minutes at about 95° C. After cooling to about 60° C., 800 grams (6.0 moles) of 30 percent sodium hydroxide solution are added. This causes precipitation of the resin which is separated from the aqueous phase (decantation and/or filtration). The resin is then washed at least five times with 500 gram portions of warm water. The reaction flask is changed over to vacuum distillation conditions and the residual water and excess aniline are distilled off. At first, only about 7" Hg of vacuum is applied (temperature about 90° C.). As the temperature reaches about 95° C., the vacuum is increased slowly to about 10" Hg. As the temperature reaches about 100° C., the vacuum is increased slowly to about 20" Hg. When the temperature reaches about 110° C., the vacuum is increased slowly to about 28" Hg. The temperature is then allowed to rise with 28" Hg vacuum to 200° C. while continuing to distill. At about 200 to 220° C., the distillation is stopped and the product poured into a pan to cool. The resulting aromatic amine-formaldehyde resin is a clear, low melting solid at room temperature.

EXAMPLES K–N

Following the same general procedure described in Example J, a series of aromatic amine-aldehyde resins were prepared. Table I below describes each resin:

TABLE II

| Example | K | L | M | N |
|---|---|---|---|---|
| Aromatic amine | Aniline | o-Toluidine | p-Chloroaniline | Aniline |
| Aldehyde | Formaldehyde | Formaldehyde | Formaldehyde | Formaldehyde |
| Molar ratio of aldehyde to aromatic amine | 0.80/1 | 0.90/1 | 0.9/1 | 0.90/1 |
| Catalyst | Hydrochloric acid | Hydrochloric acid | Hydrochloric acid | Phosphoric acid |
| Molar ratio of catalyst to aromatic amine | 1/1 | 1/1 | 1/1 | 1/1 |
| Catalyst neutralizer | Sodium hydroxide | Sodium hydroxide | Sodium hydroxide | Sodium hydroxide |

EXAMPLE 1

Preparation of thermosetting resin powder from aromatic amine-aldehyde resin and an aromatic polycarboxylic compound 1,000 grams of resin from Example J and 1,600 grams of benzophenone tetracarboxylic acid dianhydride (BTDA) are ground together through a laboratory Raymond mill (hammer mill) until essentially all of the material passes U.S. Sieve No. 140. The product is a tan colored resin powder. When a small amount is placed on a hot plate at about 400° F., this resin powder softens and then cures to a hard thermoset resin. When an attempt is made to mold this resin powder in a conventional, thermoset compression mold under varying conditions (temperature 400 to 600° F., pressure 4,000–10,000 p.s.i., cure time 10 to 120 minutes), excess volatiles prevent the obtainment of a satisfactorily molded piece. Volatile content is determined by heating 3 grams in an inert atmosphere (nitrogen) at 600° F. for 10 minutes and calculating the percent weight loss. By this test, this resin powder shows approximately 9 percent volatiles.

EXAMPLES 2–6

Following the same general procedure described in Example 1, a series of resin powders are prepared from aromatic amine-aldehyde resins and aromatic polycarboxylic compounds. Table III below describes each resin (including Example 1).

EXAMPLE 8

Preparation of unfilled molding powder from aromatic amine-aldehyde resin and an aromatic polycarboxylic compound Part A.—Resin powder from Example 1 is processed in a laboratory Banbury (Farrel midget mixer) under the following conditions:

| | |
|---|---|
| Charge weight | 320–340 grams. |
| Jacket temperature at start | 320° F. (steam heated). |
| Rotor speed | 95 r.p.m. |
| Ram air pressure | 80 p.s.i. |
| Mixing time | 2 minutes. |

After about three-quarters of a minute of mixing, visible vapors are evolved (largely steam). The temperature of the charge is estimated to be about 350° F. at this point. The charge then becomes stiffer and is ground by the action of the rotors to a coarse powder before discharging. The temperature increases to about 460° F. before the end of the cycle. After cooling to room temperature, the coarse powder is ground through a laboratory Raymond mill until essentially all of the material passes U.S. Sieve No. 140. It is then blended to insure uniformity. The product is darker brown than that of Example 7. By the volatile test given in Example 1, this unfilled molding powder shows approximately 1–1½ percent volatiles, so that about 7½ percent to 8 percent volatiles have thus been removed.

TABLE III

| | 1 | 2 | 3 | 4 | 5 | 6 |
|---|---|---|---|---|---|---|
| Part A (resin type) (Ex. No.) | J | C | D | I | K | H |
| Part B (aromatic polycarboxylic compound) | BTDA | BTDA | BTDA | TMA | {BTDA / TMA} | PMDA |
| Ratio by weight of A to B | 1:1.60 | 1:1.28 | 1:1.37 | 1:0.94 | {1/1.20 / 1/0.52} | 1/1.0$^6$ |

NOTES:
BTDA=benzophenone tetracarboxylic acid dianhydride,
TMA=trimellitic anhydride,
PMDA=pyromellitic dianhydride.

EXAMPLE 7

Preparation of unfilled molding powder from aromatic amine-aldehyde resin and an aromatic polycarboxylic compound 500 grams of resin powder from Example 1 is processed on heated differential, 5 inch diameter mill rolls. The front roll (slower) is preheated to about 240° F., the back roll is left at essentially room temperature. A sheet is formed in about 2 minutes. It is cut from the rolls and re-passed 2 to 3 times before allowing to cool to room temperature. The sheet is broken up and ground through a laboratory Raymond mill until essentially all of the material passes U.S. Sieve No. 140. The product is somewhat browner than that of Example 1. By the volatile test given in Example 1, this molding powder shows approximately 7½ percent volatiles so that this mill rolling has removed about 1½ weight percent total volatiles. When an attempt is made to mold this material in a conventional thermoset, compression mold under varying conditions (temperature 400 to 600° F., pressure 4,000 to 10,000 p.s.i., cure time to 120 minutes), excess volatiles again prevent the obtainment of an imperfection-free molded body, although obvious improvement over Example 1 is noted. However, such molded body is suitable for many end use applications even so.

Part B.—A ¼ inch thick 5 inch x 5 inch molded block is prepared from this molding powder by charging about 165 grams to a compression mold preheated to about 500° F. Molding pressure equivalent to 5,000–6,000 p.s.i. is applied. After 1 to 2 minutes, the mold is gas released (breathed) 2 to 3 times. The mold is then heated under pressure over a period of about 60 minutes while increasing the temperature to about 600° F. After reaching 600° F., the mold is allowed to cool under pressure to about 400° F. (about 30 minutes) and the piece removed. The molding is dark brown in color with an excellent molded surface. It is rigid when hot, dimensionally stable without voids and is easily machined to any desired shape. A more complicated piece (threaded bottle cap) is easily molded under similar conditions except that the total cycle is reduced to about 30 minutes. This demonstrates that the molding powder has sufficient flow to mold at least relatively intricate parts of high quality.

Part C.—The above molded block is cut into ASTM flexural strength test specimens. These pieces are postcured by being heated in an air-circulating oven in accordance with the following schedule:

4 hours at 329° F.
4 hours at 428° F.
4 hours at 464° F.
4 hours at 500° F.
4 hours at 536° F.
2 hours at 554° F.

No blistering, swelling, cracking or distortion or other undesirable such effect occurs during this post-curing. Further heat aging of these specimens for test purposes is carried out at 550° F. in an air-circulating oven. Weight loss and flexural strength retention are shown in Table IV below:

TABLE IV

| Hours exposure at 550° F. | Weight loss, percent | Flexural strength, p.s.i. |
| --- | --- | --- |
| None (post-cured only) | | 15,300 |
| 200 | 1.0 | 11,800 |
| 500 | 1.8 | 10,300 |
| 1,000 | 2.5 | 11,600 |

EXAMPLE 9

Preparation of filled molding powder from aromatic amine aldehyde resin and an aromatic polycarboxylic compound Part A.—150 grams of resin powder from Example 1 and 150 grams of graphite powder (Asbury #280H) are preblended. This powder is then processed in a laboratory Banbury (Farrel midget mixer) under the following conditions:

Charge weight _____ 340–360 grams.
Jacket temperature at start ____ 320° F. (steam heated).
Rotor speed _____ 95 r.p.m.
Ram air pressure _____ 80 p.s.i.
Mixing time _____ 2 minutes.

After about three-quarters of a minute of mixing, visible vapors are evolved (largely steam). The temperature of the charge is estimated to be about 350° F. at this point. The charge then becomes stiffer and is ground by the action of the rotors to a coarse powder before discharging. The temperature increases to about 460° F. before the end of the cycle. After cooling to room temperature, the coarse powder is ground through a laboratory Raymond mill until essentially all of the material passes U.S. Sieve No. 140. It is then blended to insure uniformity. The product is a black powder. By the volatile test given in Example 1, this filled molding powder shows approximately 1–1½ percent volatiles, so that about 6½ percent to 7 percent volatiles have thus been removed.

Part B.—A ¼ inch thick 5 inch x 5 inch molded block is prepared from this molding powder by charging about 175 grams to a compression mold preheated to about 500° F. Molding pressure equivalent to 5,000–6,000 p.s.i. is applied. After 1 to 2 minutes, the mold is gas released (breathed) 2 to 3 times. The mold is then heated under pressure over a period of about 60 minutes while increasing the temperature to about 600° F. After reaching 600° F., the mold is allowed to cool under pressure to about 400° F. (about 30 minutes) and the piece removed. The molding is black with an excellent molded surface. It is rigid when hot, dimensionally stable without voids and is easily machined to any desired shape.

Part C.—The above molded block is cut into ASTM physical test specimens. These pieces are post-cured by being heated in an air-circulating oven in accordance with the following schedule:

4 hours at 329° F.
4 hours at 428° F.
4 hours at 464° F.
4 hours at 500° F.
4 hours at 536° F.
2 hours at 554° F.

No blistering, swelling, or cracking occurs during post-curing. Further heat aging of specimens for test purposes is carried out at 550 and 600° F. in an air-circulating oven.

EXAMPLE 10

Preparation of filled brake lining molding mix from amine-modified phenolic resin and an aromatic polycarboxylic compound Part A.—250 grams of resin powder from Example 1, 500 grams of asbestos fiber (Johns-Manville No. 6D24) and 250 grams of barytes are dry mixed in a laboratory Henschel mixer. Mix is then dried for one hour at 176–185° F. in an air-circulating oven.

Part B.—A ⅜ inch thick 5 inch x 5 inch molded block is prepared from this mix by first making a preform to fit this mold (about 380 grams). Preform is dielectrically preheated and charged to a compression mold preheated to about 500° F. Molding pressure equivalent to 8,000–10,000 p.s.i. is applied. After 1 to 2 minutes, the mold is gas released (breathed) 5 to 6 times. The mold is then heated under pressure over a period of about 90 minutes at 500° F. It is then allowed to cool under pressure to about 400° F. (about 30 minutes) and the piece removed. The molding is gray-brown in color with a good molded surface. It is rigid when hot, dimensionally stable without voids and of high density.

Part C.—The above molded block is cut into test specimens approximately ⁷⁄₁₆ inch x 2 inches x 3 inches. All surfaces are sanded These pieces are post-cured by being heated in an air-circulating oven in accordance with the following schedule:

4 hours at 356° F.
4 hours at 410° F.
4 hours at 464° F.
4 hours at 518° F.
4 hours at 572° F.
4 hours at 600° F.

No blistering, swelling, cracking, or other undesirable side effect occurs during this post-curing. Further heat exposure in accordance with the following schedule shows this material to have excellent heat resistance.

1 hour at 600° F.
1 hour at 700° F.
1 hour at 800° F.
½ hour at 900° F.

By the term "filler" conventional reference is had to particulate bodies which are preferably inert (as respect to the resins used in this invention) and which are preferably not thermoplastic. Also, fillers used in this invention, of course, are stable over the temperatures used in processing the resins involved (including application). Thus, typical fillers include glass bodies, especially short fibers, graphite powder, molybdenum disulfide powder, powdered metals (such as copper, bronze, aluminum, and the like), polytetrafluoroethylene powder, powdered minerals, including aluminiferous, calciferous, titaniferous, siliceous, etc. bodies (e.g. wollastonite, quartz, cryolite, barytes, silicon carbide, aluminum oxide, etc.) and the like. The boron, carbon (graphite), metallic, etc. filaments and whiskers can be used.

In an aromatic polycarboxylic compound, there can be any combination of anhydride, or acid, as defined in Formula 2. A preferred number of carbonyl-containing groups per molecule is four, such as two anhydride groups, four acid groups, or a combination of any four of these carbonyl-containing groups. A particularly preferred aromatic carbonyl containing compound is benzophenone tetracarboxylic acid dianhydride (known as BTDA). In general, the teachings of Le Blanc in U.S. Pat. 3,558,559 are followed in preparing and selecting aromatic polycarboxylic compounds for use in this invention.

The aldehydes which can be employed are alkanals such as formaldehyde, acetaldehyde, propionaldehyde and the like, arylals such as benzaldehyde, salicylaldehyde, and the like, haloalkanols, such as chloral, furfuryl, and the like. Formaldehyde is preferred. The formaldehyde can be employed in water solution or dispersion, or in an organic solvent such as methanol. It is preferred to employ the formaldehyde in aqueous solution (such as the 37 weight percent aqueous solution known as formalin). Paraform can also be used.

What is claimed is:

1. A thermosettable molding powder comprising a blend of:

(A) an aromatic polycarboxylic compound of general formula:

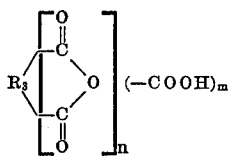 $(-COOH)_m$ in which $R_3$ is an aromatic radical of three, four, five or six valences and containing from 6 to 24 carbon atoms; $n$ is an integer of from 0 through 3; $m$ is an integer of from 0 through 6; and the sum of $2n+m$ is always equal to the valence of $R_3$;

(B) an aromatic amine-aldehyde resin characterized by having:
   (1) a number average molecular weight of from 200 to 1,000,
   (2) at least two aryl moieties per molecule, the aryl nucleus of each aryl moiety containing from 6 through 10 carbon atoms each,
   (3) at least one divalent bridging moiety of the formula:

wherein $R_1$ and $R_2$ are each individually selected from the group consisting of hydrogen, lower alkyl, lower alkylene, lower haloalkyl aryl of from 6 through 12 carbon atoms, haloaryl of 6 through 12 carbon atoms, and heterocyclic structures containing rings with 5 or 6 members, each heterocyclic ring containing an oxygen, a sulfur or a nitrogen atom, such heterocyclic structures being bonded to the carbon atom of said bridging moiety and wherein said bridging moiety has the unsatisfied valences of its carbon atom each bonded to a different one of said aryl moieties,
   (4) either at least one —NH group or at least one —NH₂, or both, per each resin molecule, one bond of which is directly attached to one of said aryl nuclei and the other bond of which is attached to another of said aryl nuclei or to a radical $R_1$ as defined above,
   (5) a number average of primary amine groups per said aryl moiety of less than about 0.99, and
   (6) a percent nitrogen acetyl of from about 3 to 30;

wherein the relative proportions of aromatic polycarboxylic compound and aromatic amine-aldehyde resin are such that the blend is thermosettable; and wherein the blend has been advanced at a temperature in the range of 300 to 600° F., and the volatiles generated by further heating to 600° F. for ten minutes, have been reduced to less than 2 percent of the initial weight of of the blend.

2. The molding powder of claim 1, having uniformly blended therewith from 10 to 80 weight percent of filler.

3. The molding powder of claim 1, wherein the aromatic polycarboxylic compound is selected from the group consisting of benzophenone tetracarboxylic acid dianhydride and pyromellitic dianhydride.

4. The molding powder of claim 1, wherein the aromatic amine-aldehyde resin comprises a condensate of formaldehyde or acetaldehyde and an aromatic amine selected from the group consisting of aniline, o-toluidine and o-chloroaniline.

5. The molding powder of claim 1 which is substantially able to pass through U.S. Sieve No. 140.

6. A process for manufacture of a thermosettable molding powder comprising the steps of:

(A) grinding a blend of:
   (1) an aromatic polycarboxylic compound of general formula:

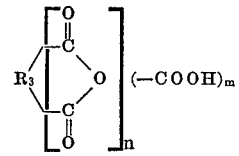 $(-COOH)_m$ in which $R_3$ is an aromatic radical of three, four, five, or six valences and containing from 6 to 24 carbon atoms; $n$ is an integer of from 0 through 3; $m$ is an integer of from 0 through 6; and the sum of $2n+m$ is always equal to the valence of $R_3$;
   (2) an aromatic amine-aldehyde resin characterized by having:
      (a) a number of average molecular weight of from about 200 to 1,000,
      (b) at least two aryl moieties per molecule, the aryl nucleus of each aryl moiety containing from 6 through 10 carbon atoms each,
      (c) at least one divalent bridging moiety of the formula:

wherein $R_1$ and $R_2$ are each individually selected from the group consisting of hydrogen, lower alkyl, lower alkylene, lower haloalkyl aryl of from 6 through 12 carbon atoms, haloaryl of 6 through 12 carbon atoms, and heterocyclic structures containing rings with 5 or 6 members each, each individual ring containing an oxygen, a sulphur, or a nitrogen atom, each such heterocyclic structure being bonded to the carbon atom of said bridging moiety, said bridging moiety having the unsatisfied valences of its carbon atom each bonded to a different one of said aryl moiety,
      (d) either at least one —N Hgroup or at least one —NH₂, or both, per each resin molecule, one bond of which is directly attached to one of said aryl nuclei and the other bond of which is attached to another of said aryl nuclei or to a radical $R_1$ as defined above,
      (e) a number average of primary amine groups per said aryl moiety of less than about 0.99, and
      (f) a percent nitrogen acetyl of from about 3 to 30;

wherein the relative proportions of aromatic polycarboxylic compound and aromatic amine-aldehyde resin are such that the blend is thermosettable;

(B) subjecting the blend simultaneously to a shear field between 80 and 800 sec.⁻¹ and a temperature in the range of 300 to 600° F. for a time sufficient to advance the blend to the stage where further heating at 600° F. for ten minutes will generate less than 2 percent of the initial weight of the blend as volatiles; and (C) cooling and grinding the resulting composition.

7. The process according to claim 6 wherein the aromatic polycarboxylic compound is selected from the group consisting of benzophenone tetracarboxylic acid dianhydride and pyromellitic dianhydride.

8. The process according to claim 6 wherein the aromatic amine-aldehyde resin comprises a condensate of formaldehyde or acetaldehyde and an aromatic amine selected from the group consisting of aniline, o-toluidine and o-chloroaniline.

References Cited

UNITED STATES PATENTS 3,678,008   7/1972   Huck et al.

HOWARD E. SCHAIN, Primary Examiner

U.S. Cl. X.R.

260—39 R, 39 M, 72.5; 264—120, 162